United States Patent [19]
Hunter

[11] 3,742,069
[45] June 26, 1973

[54] PURIFICATION OF POLYGLYCEROLS

[75] Inventor: Robert H. Hunter, Mendenhall, Pa.

[73] Assignee: ICI America Inc., Wilmington, Del.

[22] Filed: July 6, 1970

[21] Appl. No.: 52,704

[52] U.S. Cl.................. 260/615 R, 260/637, 210/27
[51] Int. Cl............................ B01j 1/08, C07c 43/02
[58] Fie ld of Search .................. 210/37, 38, 75, 24, 210/28, 29, 27; 260/637, 61 S

[56] References Cited
UNITED STATES PATENTS

| | | | |
|---|---|---|---|
| 3,548,010 | 12/1970 | Yoshino et al..................... | 210/24 X |
| 3,562,154 | 2/1971 | Davis et al......................... | 210/75 X |
| 2,463,677 | 3/1949 | Brandner........................... | 260/637 |
| 2,615,924 | 10/1952 | Reents................................ | 260/637 |
| 2,284,122 | 5/1942 | Boyd................................. | 210/75 X |
| 2,579,946 | 12/1951 | McClain ........................... | 210/75 X |

*Primary Examiner*—Samih N. Zaharna
*Assistant Examiner*—Thomas G. Wyse
*Attorney*—Kenneth E. Mulford and Roger R. Horton

[57] ABSTRACT

Disclosed is a process for the purification of a crude polyglycerol product which comprises preparing a slurry of an inert finely divided solid filtering aid and an aqueous solution of a crude polyglycerol, such solution having a pH of from 10 to 12, separating the solid and liquid phase of the slurry, passing the liquid phase through an anion exchange resin, and then passing the liquid phase through a cation exchange resin.

9 Claims, No Drawings

PURIFICATION OF POLYGLYCEROLS

This invention relates to a process for the purification of polyglycerols.

Polyglycerol is currently made by reacting glycerol at high temperature in the presence of an alkaline catalyst, preferably about 1 percent of sodium hydroxide based on the weight of glycerol. Water is eliminated during the reaction, resulting in the formation of polyglycerol. As the polymerization of the glycerol proceeds by heating at 250°C. to 260°C. in the presence of an alkaline catalyst, some organic acids are produced by side reactions. These acids react with the sodium hydroxide catalyst to form sodium salts. As the reaction progresses, the reaction mixture, which was initially very alkaline, becomes progressively more acidic. An aqueous solution of the reaction mixture, which has a pH of 12 or more at the start of the reaction, is found to be about neutral or only slightly alkaline when the reaction reaches the decaglycerol state and then continues to become progressively more acidic as the polymerization proceeds beyond that point.

Currently, polymerization products containing up to about 10 glycerol units per polymer molecule are being made commercially, and polymers containing up to 30 or 40 glycerol units per molecule of polymer have been reported. The crude polyglycerol, as it comes from the reactor, contains about 1 mol of organic acids for each of mol of sodium hydroxide catalyst used. These acids are in the form of their sodium salts. The polyglycerol and polyglycerol ester products now being offered commercially contain these impurities. If these impurities could be removed from the polyglycerol cheaply and efficiently, a purer and more uniform product could be obtained. In my earlier work on the preparation of this type of product, I found that the removal of these sodium salts of organic acids presents some serious processing difficulties which render their removal on a large scale economically unfeasible. The present invention overcomes this problem.

The most practical means of removing the sodium cation and the organic acid anion from the reaction product would appear to be by use of ion exchange resins. When an aqueous solution of the reaction product is passed through a cation exchange resin to remove the sodium ion, a precipitate is quickly deposited on the resin which plugs up the column and stops the flow of solution. When the aqueous solution is passed first through the anion exchange resin, thus keeping the pH of the solution highly alkaline, the same result occurs. The resin quickly becomes plugged up and the flow through it is stopped.

It has now been discovered in accordance with the present invention that a crude polyglycerol reaction product may be purified by a process which comprises the following sequence of operations:
1. preparing a slurry of an inert finely divided solid filtering aid and an aqueous solution of a crude polyglycerol, said slurry having a pH of from 10 to 12,
2. separating the solid and liquid phases of the slurry,
3. passing the liquid phase through an anion exchange resin, and
4. then passing the liquid phase through a cation exchange resin.

When the above sequence of operation is carried out, no difficulty is encountered either in separating the solid and liquid phases of the slurry or with flow through either of the ion exchange columns. The resulting product is an aqueous solution of deionized polyglycerol which can, if desired, be further purified by treatment with a decolorizing carbon and concentrated by removing the water therefrom.

The slurry of the aqueous solution of the crude polyglycerol and the inert finely divided solid filtering aid may be prepared by dissolving the crude polyglycerol polymerization product in water, adjusting the pH of the slurry to a value of from 10 to 12, and adding thereto a small amount of inert finely divided solid filtering aid. The steps of dissolving the crude polyglycerol product in water, adjusting the pH, and adding filtering aid may be carried out in any order. For example, the filtering aid may be added to the aqueous polyglycerol solution prior to adjusting the pH to a value of 10 to 12. It is essential to the successful operation of the purification process of this invention that the pH of the slurry be maintained at a value of from 10 to 12. Below a pH of about 10, some of the acidic material apparently precipitates from aqueous solution. By adjusting the pH to above 10, most of this material is kept in solution. Even above a pH of 10 there is apparently a very small amount of insoluble material in the polyglycerol product. This insoluble material is apparently sticky and will absorb on almost any solid surface which is presented to it. By adding a small amount of a finely divided inert solid, this insoluble material is absorbed on a surface of the particles and the mixture can then be filtered satisfactorily. If filtration is attempted in the absence of a filtering aid, flow through the filter is quickly stopped by plugging up the filter medium. If this material is not removed by filtration prior to anion exchange treatment, it absorbs on the ion exchange resin particles and soon causes plugging of the ion exchange resin column.

The type of inert finely divided solids which are operative in absorbing the trace amounts of insoluble sticky materials from the crude polyglycerol solution may vary widely. Apparently, any porous finely divided solid which is chemically inert to the reaction mixture is operative. Illustrative examples of finely divided inert solids which may be employed include finely ground calcium carbonate, silicas, alumina, and silicaalumina, diatomaceous earth, and Fullers earth. Bentonite clays which tends to swell in aqueous solution and all types of carbons, including bone char, are inoperable. The carbons are known to peptize badly under alkaline conditions. It would appear therefore that any material which is chemically inert to the aqueous polyglycerol solution and which contains a large surface area for the absorption of the sticky non-filterable impurity in the polyglycerol may be used.

The amount of filter aid which is employed may vary over a wide range and will depend somewhat on the purity of the particular crude polyglycerol which is to be purified. In general, the amount of filtering aid employed should be at least about 0.5 percent and preferably at least 1.0 percent based on the weight of polyglycerol. The lower limit is not particularly critical but is that amount which is necessary to substantially remove the insoluble portions of the polyglycerol. The amount of filtering aid should not be over 4 percent and preferably not over 2 percent by weight based on the weight of the polyglycerol. The use of larger amounts of filtering aid is uneconomical. It will be understood, of course, that amounts of filtering aid below 0.5 percent or above 4 percent may be used if desired. In any event the amount of filtering aid which is used in that amount necessary to remove substantial amounts of the insoluble, sticky material which is present in the crude polyglycerol.

The slurry of filtering aid and aqueous polyglycerol solution may be separated into a solid phase and a liquid phase by any means conventionally used in the art for separating a slurry into its individual phases. The specific means employed may include filtration or centrifugation.

After preliminary removal of the above described insoluble material, it is essential that the solution be passed first through an anion exchange column prior to being passed through a cation exchange resin column. In this way, the pH of the solution is kept highly alkaline until after essentially all of the organic acid constituents are removed. If the cation exchange resin operation is conducted first, then the low pH resulting from the removal of the sodium ions causes precipitation of some of the acidic components, thereby causing plugging of the cation exchange column.

Anion and cation exchange resins which may be used in the process of this invention include any of those resins which are commercially available. The selection of a particular resin to be employed is an engineering decision based upon exchange capacities, flow rates, and other factors affecting the cost of operation. Illustrative examples of specific anion and cation exchange resins which may be used in the process of this invention include polymers of acrylic acid, maleic acid, salts of ethylene-sulfonic acid, aminoalkyl acrylates, aminoalkyl acrylamides, and quaternary ammonium compounds and the anion and cation exchange resins disclosed in U.S. Pat. No. 3,024,207.

Following the above sequence of operations, the effluent from the cation exchange column is essentially free of any significant amounts of ions but is generally on the acidic side with a pH of about 3 to 4. At this point the product is very susceptible to decolorization by means of activated carbon and may be rendered essentially colorless by such treatment. Attempts to decolorize the product by means of activated carbon treatment prior to ion exchange or after anion exchange but before cation exchange, that is when the pH is alkaline, results in virtually no removal of color from the product.

As a result of the present invention, it is now possible to prepare highly purified polyglycerol in a practical, economical way on a large scale. It is also possible by the process of this invention to recover the by-product organic acid simply and easily from the anion exchange column.

In order that those skilled in the art may better understand how the present invention may be practiced, the following examples are given. These examples are set forth solely for the purpose of illustration and any specific enumeration of details contained therein should not be interpreted as expressing limitations of this invention. All parts and percentages are by weight unless otherwise stated.

EXAMPLE 1

3500 grams of U.S.P. glycerol containing 3.74 percent water and 39 grams of sodium hydroxide are charged to a 5-liter reaction flask equipped with a thermometer, agitator, and a small fractionating column on the flask outlet. The mixture is heated at 250°C. to 260°C. for 15 hours, during which time 778 grams of condensate containing 741 grams of water are removed through the fractionating column. The theoretical water of evolution is 741 grams for the preparation of decaglycerol (131 grams free water in the glycerol, 17 grams of water from the neutralization of the sodium hydroxide catalyst, and 593 grams of water of reaction). The reaction product weighs 2761 grams and is a dark, very viscous liquid having the following analysis: acid number 0.6, hydroxyl number 852, and 3.0 percent sulfated ash. The reaction product is dissolved in water to form a 50 percent solution. The solution has a pH of approximately 8. The solution is divided into several fractions and treated as follows:

Fraction A is passed through a cation exchange column packed with AMBERLITE IR-120 cation exchange resin (a polystyrene resin containing sulfonate groups). The column is plugged very quickly and all flow is stopped.

Fraction B is passed through an anion exchange column which is packed with AMBERLITE IRA-400 anion exchange resin (a polystyrene resin containing quaternary ammonium groups). The column soon becomes plugged and all flow is stopped.

Fraction C is adjusted to a pH of 11.5 with a small portion of 10 percent sodium hydroxide solution. When this solution is passed through the anion exchange column, the column slowly becomes plugged until all flow is stopped.

Fraction D — a portion of Fraction C is filtered through No. 2 Whatman filter paper on a Buchner funnel. The paper rapidly becomes plugged and flow through the filter ceases.

Fraction E — diatomaceous earth in the amount of 2 percent on the polyglycerol is added to Fraction C, stirred for a few minutes and filtered through No. 2 Whatman paper on a Buchner funnel. Filtration is rapid and the filtration rate remains constant until all the material has passed through the filter.

Fraction F — some of the filtrate from Fraction E is passed through the AMBERLITE IR-120 cation exchange column. The column promptly becomes plugged and flow through the column is stopped.

Fraction G — the remaining filtrate from Fraction E is passed through the AMBERLITE IRA-400 anion exchange resin column and then through the AMBERLITE IRA-120 cation exchange resin column. Flow through the column is sustained at a normal rate throughout the operation. The product emerging from the cation exchange column is a dark red solution having a pH of about 3 to 4. This product, when treated with 2 percent activated carbon based on the polyglycerol content at 100°C. for 30 minutes under nitrogen and then filtered through diatomaceous earth is virtually water white in color. After vacuum stripping to remove the water, the product has the following analysis: acid number 3.3, hydroxyl number 884, and 0.1 percent sulfated ash.

When a portion of Fraction E is treated with activated carbon in the same manner prior to ion exchange at a pH of 11.5, no improvmeent in color is obtained.

EXAMPLE 2

3500 grams of an aqueous solution of glycerol containing 3.77 percent by weight of water and 39 grams of sodium hydroxide are charged to a 5-liter glass flask and heated under nitrogen at a temperature of 250°–255°C. for 8 hours. 607 grams of condensate containing 583 grams of water are collected. The theoretical water evolution is 588 grams for the preparation of triglycerol (132 grams free water in the glycerol, 17 grams of water from the neutralization of the sodium hydroxide catalyst, and 439 grams of water of reaction). The crude product, 2917 grams, is dissolved to 50 percent concentration in distilled water. The aqueous solution has a pH of 8.4. The pH of the solution is adjusted to 11 and 2 percent by weight of a diatomaceous earth based on the weight of triglycerol is added. The resulting slurry is filtered through No. 1 Whatman filter paper on a Buchner funnel. The filtrate is then passed through an anion exchange column and then through a cation exchange column. The column effluent is then treated with activated carbon, filtered, and then vacuum stripped to yield a straw colored, very viscous liquid with the following analysis: acid number 3.2, hydroxyl number 1160, and 5.9 percent water.

Although this invention has been described with reference to specific crude polyglycerols, filtering aids, anion exchange resins, and cation exchange resins, and to specific process conditions, it will be appreciated that numerous other materials may be substituted for those described and that the particular process conditions employed may be modified, all within the spirit and scope of this invention.

Having described my invention, what is desired to be secured by Letters Patent is:

1. A process for the purification of a crude polyglycerol product obtained by the polymerization of glycerine consisting essentially of
   1. preparing a slurry of an inert finely divided solid filtering aid and an aqueous solution of said crude polyglycerol having a pH from 10 to 12,
   2. separating the solid and liquid phase of the slurry,
   3. passing the liquid phase through an anion exchange resin, and then
   4. passing the liquid phase through a cation exchange resin.

2. A process of claim 1 wherein the effluent from the cation exchange resin is decolorized with activated carbon.

3. A process of claim 1 wherein the amount of inert finely divided solid filtering aid present in the slurry is at a concentration of from 0.5 percent to 4 percent based on the weight of polyglycerol.

4. A process of claim 1 wherein the inert finely divided solid filtering aid is selected from the group consisting of diatomaceous earth, calcium carbonate, and Fullers earth.

5. A process of claim 1 wherein the polyglycerol contains at least 3 glycerol units per polyglycerol molecule.

6. A process of claim 1 wherein the polyglycerol contains from 3 to 10 glycerol units per polymer molecule.

7. A process of claim 1 wherein the polyglycerol contains from 3 to 40 glycerol units per polymer molecule.

8. A process of claim 1 wherein the effluent from the cation exchange resin is concentrated by the removal of water.

9. A process of claim 1 wherein the anion exchange resin is a strong base anion exchange resin and the cation exchange resin is a strong acid cation exchange resin.

* * * * *